(12) United States Patent
Motha et al.

(10) Patent No.: US 10,010,030 B2
(45) Date of Patent: Jul. 3, 2018

(54) POLYMER COMPOSITION COMPRISING A BLEND OF A MULTIMODAL POLYETHYLENE AND A FURTHER ETHYLENE POLYMER SUITABLE FOR THE PRODUCTION OF A DRIP IRRIGATION PIPE

(71) Applicants: Borealis AG, Vienna (AT); ABU DHABI POLYMERS CO. LTD (BOROUGE) L.L.C., Abu Dhabi (AE)

(72) Inventors: Kshama Motha, Helsinki (FI); Anette Nilsson, Stenungsund (SE); Prashant Nikhade, Maharashtra (IN); Chanchal Dasgupta, Mumbai (IN); Johan Asting, Abu Arab Emirates (AE)

(73) Assignees: BOREALIS AG, Vienna (AT); ABU DHABI POLYMERS CO. LTD (BOROUGE) L.L.C., Abu Dhabi (AE)

( * ) Notice: Subject to any disclaimer, the term of this patent is extended or adjusted under 35 U.S.C. 154(b) by 320 days.

(21) Appl. No.: 14/441,823

(22) PCT Filed: Nov. 7, 2013

(86) PCT No.: PCT/EP2013/003351
§ 371 (c)(1),
(2) Date: May 8, 2015

(87) PCT Pub. No.: WO2014/072056
PCT Pub. Date: May 15, 2014

(65) Prior Publication Data
US 2015/0305256 A1 Oct. 29, 2015
US 2016/0143231 A2 May 26, 2016

(30) Foreign Application Priority Data
Nov. 9, 2012 (EP) .................................... 12007622

(51) Int. Cl.
| | |
|---|---|
| *A01G 25/02* | (2006.01) |
| *C08L 23/08* | (2006.01) |
| *F16L 9/127* | (2006.01) |
| *B29C 47/00* | (2006.01) |
| *C08L 23/06* | (2006.01) |
| *C08K 3/04* | (2006.01) |
| *B29K 23/00* | (2006.01) |
| *B29K 105/16* | (2006.01) |
| *B29K 507/04* | (2006.01) |
| *B29L 23/00* | (2006.01) |

(52) U.S. Cl.
CPC .......... *A01G 25/02* (2013.01); *B29C 47/0023* (2013.01); *B29C 47/0066* (2013.01); *C08K 3/04* (2013.01); *C08L 23/06* (2013.01); *C08L 23/08* (2013.01); *C08L 23/0815* (2013.01); *F16L 9/127* (2013.01); *B29C 2793/009* (2013.01); *B29C 2793/0045* (2013.01); *B29K 2023/0625* (2013.01); *B29K 2023/0658* (2013.01); *B29K 2105/16* (2013.01); *B29K 2507/04* (2013.01); *B29L 2023/22* (2013.01); *C08L 2314/02* (2013.01)

(58) Field of Classification Search
CPC ................ A01G 25/02; B29C 47/0066; B29C 47/0023; B29C 2793/0045; B29C 2793/009; C08L 23/06; C08L 23/08; C08L 23/0815; F16L 9/127; B29L 2023/22; B29K 2023/0658; B29K 2023/0625; B29K 2105/16; B29K 2507/04
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,143,820 A * | 3/1979 | Bright, Sr. | ........... A01G 25/023 137/238 |
| 4,532,311 A | 7/1985 | Fulks et al. | |
| 4,543,399 A | 9/1985 | Jenkins, III et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |

(Continued)

FOREIGN PATENT DOCUMENTS

| | | | |
|---|---|---|---|
| CN | 1247878 A | * | 3/2000 |
| CN | 1640236 A | | 7/2005 |

(Continued)

OTHER PUBLICATIONS

Peacock, A.J.; Handbook of Polyethylene: Structure, Properties, and Applications, 2000, p. 43-66.*
Geldart, "The Design of Distributors for Gas-Fluidized Beds", Powder Technology, vol. 42 (1985) pp. 67-78.
International Search Report of International Application No. PCT/EP2013/003351 dated Jan. 14, 2014.
Written Opinion of the International Searching Authority of International Application No. PCT/EP2013/003351 dated Jan. 14, 2014.

(Continued)

*Primary Examiner* — Robert Jones, Jr.
(74) *Attorney, Agent, or Firm* — Roberts Mlotkowski Safran Cole & Calderon, P.C.

(57) ABSTRACT

The present application relates to a polymer composition as defined in claims comprising (A) a polymer base resin, which comprises a blend of (A-1) a multimodal ethylene polymer and (A-2) an ethylene polymer, and carbon black, a drip irrigation pipe comprising said polymer composition, a process for producing said drip irrigation pipe, pellets comprising said polymer composition and the use of said polymer composition for producing said drip irrigation pipe.

12 Claims, 2 Drawing Sheets

(56) References Cited

U.S. PATENT DOCUMENTS

Figure 1:
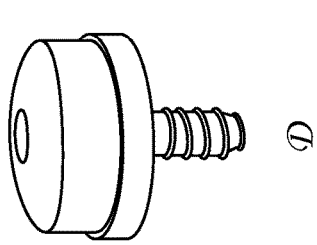
Figure 1:
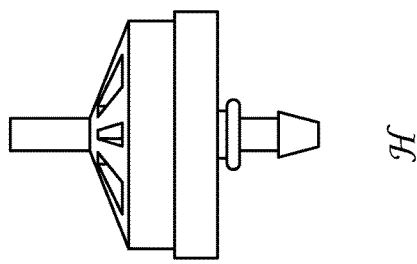
Figure 1:
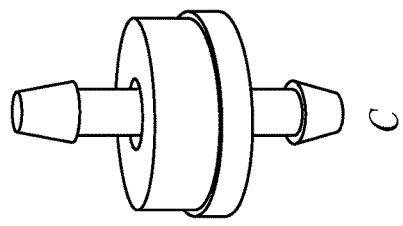
Figure 1:
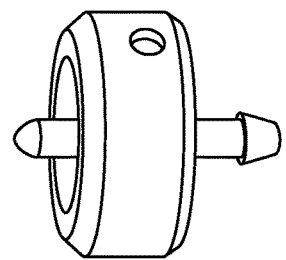
Figure 1:
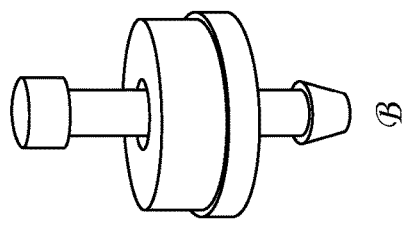
Figure 1:
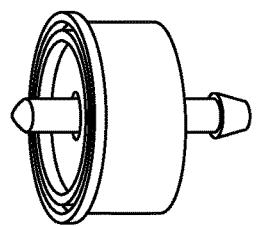
Figure 1:
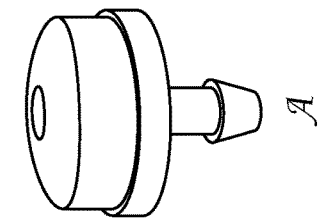
Figure 1:
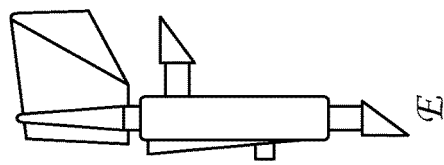

| | | | |
|---|---|---|---|
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 2003/0042658 | A1* | 3/2003 | Vahala ............ B29C 47/02 264/433 |
| 2003/0149180 | A1* | 8/2003 | Van Dun ............ C08L 23/0815 525/240 |
| 2007/0273066 | A1* | 11/2007 | Johansson ............ C08L 23/0807 264/454 |

FOREIGN PATENT DOCUMENTS

| | | |
|---|---|---|
| EP | 0188125 A2 | 7/1986 |
| EP | 0250169 A2 | 12/1987 |
| EP | 0479186 A2 | 4/1992 |
| EP | 0560035 A1 | 9/1993 |
| EP | 0721798 A2 | 11/1993 |
| EP | 0579426 A1 | 1/1994 |
| EP | 0600414 A1 | 6/1994 |
| EP | 0688794 A1 | 6/1995 |
| EP | 0699213 B1 | 3/1996 |
| EP | 0684871 B1 | 5/1998 |
| EP | 0707513 B1 | 9/1998 |
| EP | 0891990 A2 | 1/1999 |
| EP | 0696293 B1 | 5/2000 |
| EP | 1310295 A1 | 5/2003 |
| EP | 1415999 A1 | 5/2004 |
| EP | 1574549 A1 | 9/2005 |
| EP | 1591460 A1 | 11/2005 |
| EP | 2130862 A1 | 12/2009 |
| WO | 9425495 A1 | 11/1994 |
| WO | 00/29452 A1 | 5/2000 |
| WO | 01/55230 A | 8/2001 |
| WO | 03/066699 A1 | 8/2003 |
| WO | 2005087261 A2 | 9/2005 |
| WO | 2005/095509 A1 | 10/2005 |
| WO | 2007025640 A1 | 3/2007 |
| WO | 2007045415 A1 | 4/2007 |

OTHER PUBLICATIONS

International Preliminary Report on Patentability of International Application No. PCT/EP2013/003351 dated May 12, 2015.

* cited by examiner

# POLYMER COMPOSITION COMPRISING A BLEND OF A MULTIMODAL POLYETHYLENE AND A FURTHER ETHYLENE POLYMER SUITABLE FOR THE PRODUCTION OF A DRIP IRRIGATION PIPE

The present invention relates to a polymer composition suitable for the production of a drip irrigation pipe comprising a base resin, which comprises a blend of a multimodal ethylene polymer, a further ethylene polymer which is other than said multimodal ethylene polymer and carbon black, to pellets of said polymer composition, to a drip irrigation pipe comprising said polymer composition, to process for producing said pipe and to the use of said polymer composition for the production of said pipe.

In agriculture (farming including fruit production) and other planted green areas like private and public gardens and golf courses, one of the main types of irrigation systems is drip irrigation. The pipes for drip irrigation system have perforations arranged at intervals along the pipe wall and typically also so called "emitters", known also e.g. as (drip) inserts, drippers or fittings, which are inserted to the pipe wall at the location of the perforation and are typically designed to charge water at predetermined rate from said perforation.

Drip irrigation pipes are normally thin-walled with typical diameter of less than 35 mm. The cross-section can be round or flattened to an ellipse shape.

The perforations and emitters are typically introduced to the pipe wall using either of the two process known as in-line or on-line-process.

In the on-line process the pipe producer supplies the irrigation pipe without perforations and emitters to the end user, e.g. farmer. The end user punches the perforations and inserts the emitters into the punctured pipe wall before the end use. Thereby, the emitters are inserted into the perforations from the outside of the pipe.

In the in-line process the perforations and emitters are provided by the pipe producer during the pipe production process. The difference is in the order and method for introducing said perforations and emitters into the pipe. Accordingly, the emitters are first inserted into the inner pipe wall, at intervals along the pipe length, at time of forming the pipe. The obtained pipe with emitters is then perforated (punched) further downstream of the process.

The "on-line" irrigation pipes are typically for wide space crop irrigation and "in-line" irrigation pipes for close space crop irrigation (distance between plants shorter than in wide space crop).

The in-line process is material-wise and production-wise more demanding than the on-line process. Accordingly, in the in-line process the emitters are placed inside the pipe at point of forming, typically at point of extruding, the shape of pipe. Thus the inserted emitters adhere to the hot (and still "soft") inner wall of the freshly formed pipe. The adherence of the emitter at the inner wall must be sufficient to keep the emitter in fixed position during the perforation step and at the end use.

Due to different insertion techniques the emitters for the in-line process are different from those of the on-line process, and have typically cylindrical or flat rectangular shape. Moreover, one surface of the emitter for in-line process, which surface is intended to be in contact with the inner wall of the pipe, is provided with a water discharge arrangement(s) comprising a water path pattern ending to an intended water discharge point. The pipe is punched at said intended water discharge point of the emitter. It is thus important that the emitter is sufficiently adhered to the inner pipe wall to enable precise punching at the intended water discharge points along the length of the pipe. On the other hand, the adherence should not be too tight against the inner wall to enable the water flow within the water path and the water discharge from the intended discharge point. The correct insertion of the emitter (i.e. the surface with water discharge arrangement(s) comes in contact with the inner wall) and sufficient adherence plays very important role to enable to punch pipe wall precisely at intended water discharge points of the emitters and finally the desired water discharge performance at the end use site. Irrigation pipes produced by in-line process can result in more controlled performance of irrigation pipe system compared to the irrigation pipes produced by on-line. However, pipe polymer materials presently offered by the polymer suppliers have often a drawback of not fully meeting the above demanding requirements.

Naturally the irrigation pipe production should be industrially feasible, which can be challenging especially in case of in-line production.

Additionally, irrigation pipes are often folded and stored in folded form before and/or after the use. Further, intentional or unintentional folding can occur at the end use site. The folding causes the so-called kinking problem, i.e. the opening angle at the fold should be open enough to enable the water pass through the folded part of the pipe for providing a continuous water flow.

WO 2005/095509 discloses a polymer composition comprising a multimodal ethylene polymer composition for the use in drip irrigation pipes. The pipes are shown to have good mechanical properties but the document is i.a. silent of the water discharge behavior.

There is still need for an improved polymer composition for the production of drip irrigation pipes with good water flow discharge performance together with good processing behavior for providing drip irrigation pipes, and, particularly, for the production of drip irrigation pipes in in-line process with advantageous perforation and water discharge charge quality and at the same time being producible at industrially feasible production rates.

FIGS. 1A to 1H illustrate emitters for the on-line process suitable for the present invention. FIGS. 2A and 2E illustrate emitters for the in-line process suitable for the present invention. FIGS. 2A and 2B illustrate cylindrical forms of the emitters; FIGS. 2C, 2D and 2E illustrate parts of a flat form of the emitters.

The present invention therefore relates to a polymer composition comprising
 (A) a polymer base resin comprising
  (A-1) a multimodal ethylene polymer having a density of 930 kg/m$^3$ or less, and
  (A-2) a further ethylene polymer which is other than the multimodal ethylene polymer (A-1) and selected from
   (A-2-a) ethylene polymer produced in the presence of a coordination catalyst or
   (A-2-b) ethylene polymer produced in a high pressure polymerization process in the presence of a radical initiator, or mixtures thereof,
  wherein the amount of the multimodal ethylene polymer (A-1) is of 65 wt % to 96 wt % and the amount of the ethylene polymer (A-2) is of 4 wt % to 35 wt %, based on the total amount of the polymer base resin (A); and
 (B) carbon black;
wherein the polymer composition has a MFR$_5$ of 1.5 g/10 min to 10 g/10 min.

The polymer composition of the invention is highly suitable for drip irrigation pipes, preferably for drip irrigation pipes produced by the above and below described in-line process.

The polymer composition of the invention is referred herein also shortly as polymer composition. Similarly, the polymer base resin(A), the multimodal ethylene polymer (A-1), the ethylene polymer (A-2) which is other than the multimodal ethylene polymer (A-1), ethylene polymer (A-2-a) produced in the presence of a coordination catalyst or ethylene polymer (A-2-b) produced in a high pressure polymerization process in the presence of a radical initiator and, respectively, carbon black (B) of the polymer composition of the invention are also referred as polymer base resin (A), multimodal ethylene polymer (A-1), ethylene polymer (A-2), ethylene polymer (A-2-a), ethylene polymer (A-2-b) and, respectively carbon black. The drip irrigation pipe of the invention is referred also shortly as irrigation pipe.

Usually it is difficult to get good flow discharge performance with good processability and output rate. The polymer composition of the invention with the claimed MFR and with combination of a carbon black with the blend of the multimodal ethylene polymer component (A-1) and the ethylene polymer (A-2) is surprisingly suitable polymer material for an irrigation pipe, and particularly for an irrigation pipe which is produced according to said in-line process. Unexpectedly the polymer composition has excellent processing behavior for producing an irrigation pipe. Moreover, the obtained irrigation pipe has highly desirable water dripping discharge performance.

Accordingly, the blend of the multimodal ethylene polymer (A-1) and ethylene polymer (A-2) together with the claimed final MFR has high die swell (implies increased melt strength) which contributes to improved water flow discharge performance i.a. in terms of advantageous adherence of the emitter to the inner pipe wall enabling precise punching of perforations with good perforation quality as well as desired controlling of water flow discharge rate at the end use site of the obtained irrigation pipe. Moreover, the polymer composition enables to produce the irrigation pipe at higher production rates, since, with the claimed multimodal ethylene polymer (A-1)/ethylene polymer (A-2)-blend, the extrusion rate can be increased and, preferably, the punching speed for forming the perforations can also be increased compared to prior art. Furthermore, the obtained drip irrigation pipe has preferably less kinking problems.

As to definitions, the term "further ethylene polymer which is other than the multimodal ethylene polymer (A-1)" means that the multimodal polyethylene (A-1) and (A-2) are different with respect at least one polymer property, for instance any one or more of density, MFR, comonomer content or a property due to different polymerisation process, i.e. radical or coordination catalyst initiated polymerisation.

"Ethylene polymer produced in the presence of a coordination catalyst" means that the ethylene polymer is polymerized in a solution, slurry, including loop, or gas phase process or any combinations thereof using a "coordination catalyst" (also known as "low pressure" process to make difference to "high pressure process"). "Coordination catalyst" means a well known catalyst system which preferably comprises a catalytically active chromium catalyst component, Ziegler-Natta catalyst component or single site including metallocene and non-metallocene catalyst component, or any combinations thereof, as well as a cocatalyst as the active components. The preferred coordination catalyst is Ziegler-Natta catalyst system as described further later below.

"Ethylene polymer produced in a high pressure polymerization process" means that the ethylene polymer is polymerized in a tubular or autoclave reactor in a high pressure process in the presence of a radical initiator(s). "Radical initiator" is preferably a peroxide or mixture of peroxides.

"Polyethylene" or "ethylene polymer" can be homopolymer or copolymer of ethylene with at least one comonomer(s).

An "ethylene homopolymer" consists essentially of ethylene monomer units. Such homopolymer is void of any comonomer that is added on purpose to copolymerize with ethylene. Any traces of a comonomer possibly present in a reactor in industrial scale polymerization are excluded within the meaning of comonomer.

The "at least one comonomer" of the "copolymer of ethylene" is preferably at least one alpha-olefin comonomer selected from an alpha-olefin comonomer comprising from 3 to 12 carbon atoms, preferably from 4 to 8 carbon atoms. Suitable alpha-olefin comonomer species are 1-butene, 1-hexene and 1-octene. Thereby, 1-butene or 1-hexene are mostly preferred. Naturally, the amount of the comonomer depends e.g. on the desired final density of the polymer.

"Multimodal" means herein an ethylene polymer comprising at least two polyethylene fractions, which have been produced under different polymerisation conditions, including differences in any of process conditions and/or catalyst system, resulting in different (weight average) molecular weights and/or different comonomer contents for the fractions. The prefix "multi" relates to the number of different polymer fractions of the composition and includes "bimodal" composition consisting of two fractions.

E.g. the multimodality re weight average molecular weight means that the form of the molecular weight distribution curve, i.e. the appearance of the graph of the polymer weight fraction as function of its molecular weight, of such a multimodal ethylene polymer (A-1) will show two or more maxima or at least be distinctly broadened in comparison with the curves for the individual fractions.

The multimodal ethylene polymer (A-1) according to the invention preferably comprises a low molecular weight component (LMW) and a high molecular weight component (HMW), wherein the weight average molecular weight (Mw) of the HMW component is higher than the Mw of the LMW component. Accordingly, the "multimodal" means herein multimodal with respect to molecular weight distribution (Mw/Mn, MWD).

The base resin (A) of the polyethylene composition comprises the multimodal ethylene polymer (A-1) as defined above, below or in claims.

The LMW component is preferably present in the multimodal ethylene polymer (A-1) in an amount of 35 wt % to 50 wt %, more preferably 38 wt % to 50 wt %, still more preferably 38 wt % to 48 wt %, most preferably 38 wt % to 46 wt %.

Preferably, the HMW component is present in the multimodal ethylene polymer (A-1) in an amount of 50 wt % to 65 wt %, more preferably of 50 wt % to 62 wt %, still more preferably of 52 wt % to 62 wt %, most preferably 54 wt % to 62 wt %.

Preferably, the weight ratio of the LMW component to the HMW component is (35-50):(65-50), more preferably (38-50):(62-50), still more preferably (38-48):(62-52), most preferably (38-46):(62-54).

Moreover, the multimodal ethylene polymer (A-1) can comprise further polymer components which are different from said LMW and HMW components with respect to weight average Mw or comonomer content or both.

However, it is preferred that the multimodal ethylene polymer (A-1) consists of said HMW component, said LMW component and optionally a prepolymer fraction. The optional prepolymer fraction is in an amount of up to 20 wt %, more preferably up to 10 wt %, and most preferably up to 5 wt % of the total amount of the multimodal ethylene polymer (A-1). The multimodal ethylene polymer (A-1) most preferably consists of said HMW component, said LMW component and a prepolymer fraction. The amount of the prepolymer fraction is calculated to the weight amount of the LMW component, which is in turn based on the total amount of the multimodal ethylene polymer (A-1) composition.

The multimodal ethylene polymer (A-1) has preferably a melt flow rate $MFR_5$ of 6.0 g/10 min or less, more preferably 5.0 g/10 min or less, most preferably 4.0 g/10 min or less.

Preferably, the multimodal ethylene polymer (A-1) has a melt flow rate $MFR_5$ of 0.8 g/10 min or more, more preferably of 1.0 g/10 min or more.

The multimodal ethylene polymer (A-1) has preferably a melt flow rate $MFR_2$ of 1.5 g/10 min or less, more preferably 1.0 g/10 min or less.

Preferably, the multimodal ethylene polymer (A-1) has a melt flow rate $MFR_2$ of 0.2 g/10 min or more, more preferably of 0.3 g/10 min or more.

The multimodal ethylene polymer (A-1) is preferably a multimodal copolymer of ethylene with at least one alpha-olefin, which is more preferably a linear low density ethylene copolymer (LLDPE). The term LLDPE has a well known meaning.

Said at least one alpha-olefin comonomer of the multimodal copolymer of ethylene (A-1), preferably of LLDPE, as defined above, below or in claims, is selected from an alpha-olefin comonomer comprising from 3 to 12 carbon atoms, preferably from 4 to 8 carbon atoms. Suitable alpha-olefin comonomer species are 1-butene, 1-hexene and 1-octene. Thereby, 1-butene or 1-hexene are mostly preferred.

The copolymer of ethylene, preferably LLDPE, as the multimodal ethylene polymer (A-1) has preferably a comonomer content of more than 0.3 mol %, more preferably more than 3 mol %.

Further, the copolymer of ethylene, preferably LLDPE, as the multimodal ethylene polymer (A-1) has preferably a comonomer content of below 15 mol %, more preferably below 10 mol %.

The LMW component of copolymer of ethylene, preferably LLDPE, as the multimodal ethylene polymer (A-1) can be an ethylene homopolymer or a copolymer of ethylene with at least one alpha-olefin comonomer as defined above for the multimodal ethylene polymer (A-1).

The HMW component of copolymer of ethylene, preferably of LLDPE, as the multimodal ethylene polymer (A-1) can be an ethylene homopolymer or a copolymer of ethylene with at least one alpha-olefin comonomer as defined above for the multimodal ethylene polymer (A-1).

In a preferred embodiment the multimodal ethylene polymer (A-1) is a multimodal copolymer of ethylene, preferably LLDPE, as defined above or in claims, where at least the HMW component is a copolymer of ethylene, more preferably, where said HMW and LMW components are copolymers of ethylene as defined above or in claims. Moreover, if, and preferably, the LMW component is a copolymer of ethylene, then HMW component of the multimodal ethylene polymer (A-1) has higher comonomer content than the LMW component.

The multimodal ethylene polymer (A-1), preferably being a LLDPE, preferably has a density of 925 kg/m$^3$ or less and most preferably of 924 kg/m$^3$ or less. The lower limit of the density of the multimodal ethylene polymer (A-1), preferably being a LLDPE, is usually 900 kg/m$^3$. Preferably, the density of the multimodal ethylene polymer (A-1), preferably being a LLDPE, is 917 kg/m$^3$ or higher, more preferably 918 kg/m$^3$ or higher.

The multimodal ethylene polymer (A-1) is preferably obtainable by polymerization with a Ziegler-Natta catalyst, preferably a Ziegler-Natta catalyst as further described later below.

In addition to multimodal ethylene polymer (A-1), the polymer base resin (A) of the polymer composition according to the present invention further comprises an ethylene polymer (A-2) as defined above, below or in claims.

As a first alternative of the invention, the ethylene polymer (A-2) is one or more, preferably one, ethylene polymer(s) (A-2-a), which is preferably produced in the presence of a Ziegler-Natta catalyst system as the coordination catalyst which is described further later below in context for multimodal ethylene polymer (A-1). The ethylene polymer (A-2-a) is preferably selected from the well known group of linear low density copolymer of ethylene (LLDPE), a medium density copolymer of ethylene (MDPE) and a high density homopolymer or copolymer of ethylene (HDPE) or from a mixture thereof. The modality with respect to MWD of the ethylene polymer (A-2-a) can vary.

LLDPE as the ethylene polymer (A-2-a) has typically a density between 918 and up to 930 kg/m$^3$, MDPE as the ethylene polymer (A-2-a) has typically a density more than 930 and less than 950 kg/m$^3$, HDPE as the ethylene polymer (A-2-a) has typically a density from 950 to 980 kg/m$^3$.

The $MFR_2$ of the ethylene polymer (A-2-a) is not limited and can vary depending on the type and amount thereof. Ethylene polymer (A-2) preferably has a $MFR_2$ of 0.1 g/10 min to 30.0 g/10 min, more preferably of 0.1 g/10 min to 25.0 g/10 min, still more preferably of 0.1 g/10 min to 20.0 g/10 min and most preferably of 0.15 g/10 min to 17.0 g/10 min.

It is preferred that ethylene polymer (A-2-a) of said first alternative of (A-2) is a HDPE which has a density of 950 kg/m$^3$ or higher, preferably of 960 kg/m$^3$ to 980 kg/m. Further preferably the HDPE is unimodal with respect to MWD.

As a second alternative of the invention, the ethylene polymer (A-2) is one or more, preferably one, ethylene polymer (A-2-b) which is produced in a high pressure polymerization process in the presence of a radical initiator, which is preferably peroxide or a mixture of two or more peroxides.

The ethylene polymer (A-2-b) is preferably a well known low density ethylene polymer (LDPE) which has a density of 919 kg/m$^3$ to 935 kg/m$^3$, preferably of 920 kg/m$^3$ to 927 kg/m$^3$.

The $MFR_2$ of the ethylene polymer (A-2-b) is not limited and can vary depending on the type and amount thereof. Ethylene polymer (A-2) preferably has a $MFR_2$ of 0.1 g/10 min to 30.0 g/10 min, more preferably of 0.1 g/10 min to 15.0 g/10 min, still more preferably of 0.1 g/10 min to 10.0 g/10 min and most preferably of 0.15 g/10 min to 5.0 g/10 min.

As a third alternative of the invention, the ethylene polymer (A-2) is a mixture of ethylene polymer (A-2-a) and ethylene polymer (A-2-b). In this alternative, the weight ratio of ethylene polymers (A-2-a) to (A-2-b) is preferably from 97:3 to 3:97, preferably from 90:10 to 10:90, more preferably from 75:25 to 25:75 and most preferably from 64:40 to 40:60.

Preferably the ethylene polymer (A-2) of the polymer composition comprises at least the ethylene polymer (A-2-b) according to said second alternative of (A-2) as defined above.

It is mostly preferred that the ethylene polymer (A-2) of the polymer composition is according to said third alternative of (A-2) and comprises, preferably consists of, the mixture of ethylene polymer (A-2-a) and ethylene polymer (A-2-b) as defined above, below or in claims. In this preferred third alternative the ethylene polymer (A-2-a) is most preferably HDPE as defined above or in claims and the ethylene polymer (A-2-b) is LDPE as defined above or in claims. In this preferred third alternative the HDPE as the ethylene polymer (A-2-a) has preferably a $MFR_2$ of 0.1 g/10 min to 30.0 g/10 min, more preferably of 0.1 g/10 min to 25.0 g/10 min, still more preferably of 0.1 g/10 min to 20.0 g/10 min and most preferably of 0.15 g/10 min to 14.0 g/10 min, and said LDPE as the ethylene polymer (A-2-b) has $MFR_2$ of 0.1 g/10 min to 30.0 g/10 min, more preferably of 0.1 g/10 min to 15.0 g/10 min, still more preferably of 0.1 g/10 min to 10.0 g/10 min and most preferably of 0.15 g/10 min to 5.0 g/10 min. In this preferred embodiment ethylene polymer (A-2-a) is more preferably a HDPE which is unimodal with respect to MWD (unimodal HDPE). The preferred third alternative contributes to the advantageous property balance between high die swell ratio and stiffness of the final polymer composition, i.e. to excellent water discharge behavior and to excellent punching performance in terms of punching speed and quality of the formed perforation.

As to carbon black (B), the carbon black can be of any type feasible for use in irrigation pipes. Carbon black has preferably an average particle size of from 0.01 to 0.25 microns and max volatile matter of 9 wt %. The type of carbon black can e.g. be furnace carbon black, which furnace carbon black has a very well known meaning. Suitable carbon blacks are commercially available from several suppliers including Cabot and Colombian, and can be selected accordingly by a person skilled in the art.

Carbon black can be added to polymer composition 1) as such (neat), 2) in form of a master batch, which comprises said carbon black together with a carrier polymer which is other than the multimodal ethylene polymer (A-1) and ethylene polymer (A-2), or, preferably, 3) carbon black can be premixed together with the part or total amount of multimodal ethylene polymer (A-1) and/or with the part or total amount of ethylene polymer (A-2). In the preferred third alternative of the ethylene polymer (A-2) said carbon black can be added to the part or total amount of ethylene polymer (A-2-a) and/or to the part or total amount of ethylene polymer (A-2-b). Premixing can be effected in a conventional, commercial mixer or extruder using conventional mixing conditions as well known in the art.

When premix contains only part of the multimodal ethylene polymer (A-1) or ethylene polymer (A-2), then the amount of carbon black is from 20 to 50 wt %, preferably 30 to 50 wt %, based on the amount of the premix.

Moreover, said premix of carbon black and multimodal ethylene polymer (A-1) or ethylene polymer (A-2) is preferably extruded to pellet form.

Most preferably the carbon black is added as a premix with part of ethylene polymer (A-2), preferably at least with part of ethylene polymer (A-2-b). Preferably said premix is extruded in form of pellets.

The polymer base resin (A) of the polyethylene composition comprises, preferably consists of, the multimodal ethylene polymer (A-1) and the ethylene polymer (A-2). More preferably the polymer composition comprises, preferably consists of, the polymer base resin (A), carbon black and optional additives.

The amounts of the components, preferably of the polymer base resin (A), carbon black and optional additives, make up the total amount of the polymer composition of 100 wt %.

The amount of the polymer base resin (A) is preferably at least 80 wt %, preferably from 80 to 99 wt %, preferably from 85 to 99 wt %, more preferably from 90 to 98.5 wt %, from 91 to 98.2 wt %, based on the total amount of the polymer composition (100 wt %).

Further preferably, the amount of the ethylene polymer (A-1) is of 70 to 96 wt %, preferably of 75 to 95 wt %, more preferably of 80 to 95 wt %, based on the total amount of polymer base resin (A).

Still further preferably, the amount of the ethylene polymer (A-2) is of 4 wt % to 30 wt %, preferably of 5 wt % to 25 wt %, more preferably of 5 wt % to 20 wt %, based on the total amount of polymer base resin (A). Most preferably, the ethylene polymer (A-2) comprises, preferably consists of, the ethylene polymer (A-2-a) and the ethylene polymer (A-2-b) according to said third alternative of (A-2) as defined above or in claims, whereby the ratio of the ethylene polymer (A-2-a) to the ethylene polymer (A-2-b) can vary and is preferably from 97:3 to 3:97, preferably from 90:10 to 10:90, more preferably from 75:25 to 25:75 and most preferably from 64:40 to 40:60.

Further preferably, the weight ratio of the ethylene polymer (A-1) to the ethylene polymer (A-2) is (70-96):(30-4), preferably (75-95):(25-5), most preferably (80-95):(20-5).

The amount of the carbon black is preferably from 1 to 10 wt %, preferably from 1.5 to 9.0 wt %, more preferably from 1.8 to 8.0 wt %, based on the total amount of the polymer composition (100 wt %).

In addition to the base resin and carbon black, usual additives for utilization with polyolefins, such as stabilizers (e.g. antioxidant agents), acid scavangers and/or anti-UV's, antistatic agents and utilization agents (such as processing aid agents) may be present in the polymer composition. Preferably, the total amount of these additives is 5 wt % or below, more preferably 2 wt % or below, most preferably 1 wt % or below, based on the total amount of the polymer composition (100 wt %).

Preferably, the polymer base resin (A) consists of the multimodal ethylene polymer (A-1) and the ethylene polymer (A-2). More preferably the polymer composition comprises, preferably consists of, the polymer base resin (A) as the only polymeric component(s) present in the polymer composition. In this respect it is noted that any carrier polymer other than ethylene polymer (A-2-a) or (A-2-b) of a carbon black master batch according to option 2), as mentioned above, is not calculated to the base resin (A), but is counted separately to the total amount of the polymer composition (100 wt %) and any carrier polymer(s) for the optional additives as mentioned above is/are calculated to the total amount of the additive(s) present in the polymer composition.

The polymer composition preferably has a melt flow rate $MFR_5$ of 8.0 g/10 min or less, more preferably 5.0 g/10 min or less, most preferably 4.0 g/10 min or less.

Preferably, the polymer composition has a melt flow rate $MFR_5$ of 1.6 g/10 min or more, preferably of 1.7 g/10 min or more, more preferably of 1.8 g/10 min or more, most preferably of 1.9 g/10 min or more.

The polymer composition preferably has a melt flow rate $MFR_2$ of 2.5 g/10 min or less, more preferably 1.5 g/10 min or less, most preferably 0.9 g/10 min or less.

Preferably, the polymer composition has a melt flow rate $MFR_2$ of 0.1 g/10 min or more, more preferably of 0.2 g/10 min or more, most preferably of 0.3 g/10 min or more.

The multimodal ethylene polymer (A-1) as defined above, including the preferred embodiments, properties and property ranges thereof, can be commercially available or can be polymerized in the presence of a Ziegler-Natta catalyst preferably in a multi stage polymerization process. A multistage polymerization process denotes a process in which a polymer comprising two or more fractions is produced by polymerizing each of the at least two polymer fractions in a separate reaction stage, usually with different reaction conditions in each stage which comprises a polymerization catalyst. The polymerization is preferably followed by a compounding step.

It is preferred that the LMW component and the HMW component of the multimodal ethylene polymer (A-1) are polymerized at different stages of the multi-stage process in any order. It is thereby preferred that the LMW component and the HMW component are polymerized in subsequent stages.

It is preferred that the multimodal ethylene polymer (A-1) according to the invention is polymerized in at least one slurry phase reactor and at least one gas phase reactor.

In a preferred embodiment the LMW component is polymerized in a slurry phase reactor, preferably a loop reactor, and the HMW component are polymerized in a gas phase reactor in any order.

In any order denotes that there is no preferred order in which the subsequent polymerization stages of the multi-stage process are arranged.

In one preferred embodiment of the process according to the invention, the LMW component is polymerized in the first reaction stage.

It is thereby preferred that the HMW component is polymerized in the second reaction stage in the presence of the LMW component.

Preferably, the multistage process consists of a reaction stage conducted in a slurry phase reactor followed by a reaction stage conducted in gas phase reactors. Optionally, the reaction stage conducted in the slurry phase reactor is thereby preceded by a prepolymerization stage.

It is preferred that the LMW component is polymerized in a slurry phase reactor.

In slurry phase polymerisation the polymer particles formed in the polymerisation together with the catalyst fragmented and dispersed within the particles, are suspended in fluid hydrocarbon. The slurry phase is agitated to enable the transfer of reactants from the fluid into the particles.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

The ethylene content in the fluid phase of the slurry in the slurry phase reactor may be from 0.5 to 50% by mole, preferably from 1 to 20% by mole, and in particular from 2 to 10% by mole.

The temperature in the slurry phase polymerisation is typically from 50 to 115° C., preferably from 60 to 110° C. and in particular from 70 to 100° C. The pressure is typically from 1 to 150 bar, preferably from 1 to 100 bar.

The slurry phase polymerisation may be conducted in any known reactor used for slurry phase polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479 186 and U.S. Pat. No. 5,391,654.

It is sometimes advantageous to conduct the slurry phase polymerisation above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. No. 3,374,211, U.S. Pat. No. 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

The polyethylene fraction produced in the slurry phase reactor can be an ethylene homo- or copolymer fraction depending on the desired final multimodal polyethylene polymer (A-1). If polymerising a copolymer, comonomers preferably are selected from the group comprising 1-butene, 1-hexene, 4-methyl-1-pentene, 1-octene or their mixtures, especially preferred is 1-butene or 1-hexene. In a preferred embodiment in the slurry phase reactor an ethylene copolymer is polymerised in the presence of 1-butene as comonomer.

The residence time and the polymerisation temperature in the slurry phase reactor are adjusted in a known manner as to polymerise an ethylene homo- or copolymer fraction in an amount as defined above or in claims.

The polymer fraction produced in the slurry phase reactor preferably is transferred to at least one gas phase reactor.

In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer(s), eventually MFR regulating agent(s) (also known as chain growth controllers or chain transfer agents), such as hydrogen, and eventually inert gas. The inert gas can thereby be the same or different as the inert gas used in the slurry phase reactor. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e. g. U.S. Pat. No. 4,933,149 and EP-A-684 871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600 414 and EP-A-721 798. An overview is given in Geldart and Bayens: The Design of Distributors for Gas-fluidised Beds, Powder Technology, Vol. 42, 1985.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699 213, and WO-A-94/25495. It is also possible to add condensing agents into the recycle gas stream, as disclosed in EP-A-696 293. The condensing agents are non-polymerisable components, such as propane, n-pentane, isopentane, n-butane or isobutane, which are at least partially condensed in the cooler.

The polymeric product may be withdrawn from the gas phase reactor either continuously or intermittently. Combinations of these methods may also be used. Continuous withdrawal is disclosed, amongst others, in WO-A-00/29452. Intermittent withdrawal is disclosed, amongst others, in U.S. Pat. No. 4,621,952, EP-A-188 125, EP-A-250 169 and EP-A-579 426.

The bed level may be observed and controlled in a manner known in the art.

Also antistatic agent(s) may be introduced into the gas phase reactor if needed. Suitable antistatic agents and methods to use them are disclosed, amongst others, in U.S. Pat. No. 5,026,795, U.S. Pat. No. 4,803,251, U.S. Pat. No. 4,532,311, U.S. Pat. No. 4,855,370 and EP-A-560 035. They are usually polar compounds and include, amongst others, water, ketones, aldehydes alcohols.

The reactor may include a mechanical agitator to further facilitate mixing within the fluidised bed. An example of suitable agitator design is given in EP-A-707 513.

It is preferred that in the gas phase reactor the HMW component of the multimodal ethylene polymer (A-1) according to the invention is polymerized.

The temperature in the gas phase polymerisation in the gas phase reactor typically is at least 70° C. The temperature typically is not more than 105° C., preferably not more than 95° C. The pressure is typically at least 10 bar, preferably at least 15 bar but typically not more than 30 bar, preferably not more than 25 bar.

The residence time and the polymerisation temperature in the gas phase reactor are adjusted as such as to polymerise the multimodal ethylene polymer (A-1) with the desired split between each reactor.

Moreover, the process conditions in each reactor, the comonomer feed, if any, and the MFR regulating agent feed, typically hydrogen feed, is adjusted to obtain the desired multimodal ethylene polymer properties as defined above or in claims, for example the density (comonomer feed) and MFR (hydrogen feed) of the final polymer. Such adjustment is within the skills of the skilled person.

In one embodiment of the present invention the process may further comprise a pre-polymerisation step which precedes the polymerisation steps. The purpose of the pre-polymerisation is to polymerise ethylene optionally together with other comonomer(s), preferably only ethylene, to form polymer in a small amount onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry. It is preferred that the optional prepolymerisation is effected before the actual polymerisation step in the slurry, preferably, loop reactor.

Thus, the pre-polymerisation step may be conducted in a loop reactor. The pre-polymerisation is then preferably conducted in an inert diluent, typically a hydrocarbon diluent such as methane, ethane, propane, n-butane, isobutene, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C., more preferably from 40° C. to 70° C.

The pressure is not critical and is typically from 1 bar to 150 bar, preferably from 10 bar to 100 bar.

The Ziegler-Natta catalyst system is the preferred catalyst system for multimodal ethylene polymer (A-1) and as the preferred coordination catalyst for producing ethylene polymer (A-2-a), any system of Ziegler-Natta catalysts can be used suitable for polymerising polyethylene resins.

Preferably, the catalyst system is a supported Ziegler-Natta catalyst, more preferably containing a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Examples for suitable support materials are, for instance ES747JR produced and marketed by Ineos Silicas and SP9-491, produced and marketed by Grace.

The magnesium compound is preferably a reaction product of a magnesium dialkyl and an alcohol. The alcohol can be a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to the two alkyl groups, which may be the same or different. Butyl-octyl magnesium is one example of the preferred magnesium dialkyls.

The aluminium compound is preferably a chlorine containing aluminium alkyl. Especially preferred compounds are aluminium alkyl dichlorides and aluminium alkyl sesquichlorides.

The titanium compound is preferably a halogen containing, more preferably clorine containing titanium compound. Especially preferred is titanium tetrachloride.

The catalyst can be prepared by sequentially contacting the carrier with the above mentioned compounds, as described in EP-A-688794. Alternatively, it can be prepared by first preparing a solution from the components and the contacting the solution with a carrier, as described in WO-A-01/55230.

The above mentioned solid catalyst component is contacted with an aluminium alkyl cocatalyst, preferably a trialkyl aluminium cocatalyst, which most preferably is triethyl aluminium, after which it can be used for polymerization. The contacting of the solid catalyst component and the cocatalyst can either be conducted prior to introducing the catalyst into the polymerization reactor, or it can be conducted by introducing the two components separately into the polymerization reactor.

The catalyst system can be fed to any polymerisation stage including the optional prepolymerisation step. Most preferably the catalyst system is only fed to the first polymerisation stage or, in case of optional prepolymerisation step, at least part of the catalyst system is fed to the prepolymerisation step preceding the first polymerisation stage. The catalyst may be transferred into the polymerisation zone by any means known in the art. It is thus possible to suspend the catalyst in a diluent and maintain it as homogeneous slurry.

As to the ethylene polymer (A-2), when said ethylene polymer (A-2) is an ethylene polymer (A-2-a) which is produced in the presence of a coordination catalyst, preferably a Ziegler-Natta catalyst system, more preferably which is LLDPE copolymer, MDPE copolymer of HDPE homopolymer or copolymer, and which can be of any modality with respect to MWD, including the unimodal LLDPE, MDPE and HDPE, as defined above, said polymer can commercially available or be produced, depending on the modality of the final polymer, e.g. in a single stage or multistage process using any of the reactor type(s) and polymerisation conditions as described above for the multimodal ethylene polymer (A-1).

When said ethylene polymer (A-2) is ethylene polymer (A-2-b) which is produced in a high pressure polymerisation process using a radical initiator, more preferably which is LDPE homopolymer or copolymer as defined above, then it can be commercially available or be produced in a tubular or autoclave reactor using radical initiator, typically peroxide(s), using e.g. conventional polymerisation conditions. Polymerisation in tubular or autoclave reactor is well known and well documented in the literature in the polymerisation field.

As subsequent step of the polymerisation process, the multimodal ethylene polymer (A-1) or the ethylene polymer (A-2-a) or ethylene polymer (A-2-b) obtained from the reactor is typically compounded, preferably extruded in an extruder, optionally together with additive(s) and then pelletized to polymer pellets in a manner known in the art.

As already described above in the context of carbon black (B), carbon black can be added at this subsequent compounding step, 1) as such or 2) in master batch with a carrier polymer, which is other than multimodal ethylene polymer (A-1) and ethylene polymer (A-2), or, preferably, 3) in a premix with any of the multimodal ethylene polymer (A-1) and ethylene polymer (A-2). Or, alternatively, carbon black can be added in a separate compounding step in any of the above addition mode 1) to 3) to the premade pellets of multimodal ethylene polymer (A-1) or the ethylene polymer (A-2).

The extrusion and pelletizing can be carried out in a known manner using well known extruder equipment supplied by extruder producers and conventional extrusion conditions. As an example of an extruder for the present compounding step may be those supplied by Japan Steel works, Kobe Steel or Farrel-Pomini, e.g. JSW 460P or JSW CIM90P.

The final polymer composition is preferably produced by compounding in an extruder and pelletized before further supply to the end product, preferably irrigation pipe, producer. Accordingly, the multimodal polyethylene (A-1), ethylene polymer (A-2), carbon black and optional additive(s) can be compounded and pelletized in the above mentioned subsequent compounding step arranged in the production line of the polymerisation process of one of the multimodal polyethylene (A-1), ethylene polymer (A-2) or in a separate compounding step after the above "in-line" compounding step.

In the preferred embodiment, the polymer composition is produced during the production of the multimodal polyethylene (A-1) at the above described subsequent "in-line" compounding step. In this embodiment it is preferred that the carbon black is added (3) in a premix with the part or total amount of the multimodal ethylene polymer (A-1) or, and preferably, with the part or total amount of the ethylene polymer (A-2), as described above in context of carbon black. More preferably, said premix is added in pellet form. In case the premix contains part of the multimodal ethylene polymer (A-1) or, and preferably, part of the ethylene polymer (A-2), then the remaining part of said polymer is added separately, preferably in pellet form, to this compounding step.

Furthermore, it is preferred that the polymer composition of the invention is provided in pellet form to the end producer, preferably to the irrigation pipe producer. The polymer composition is preferably pelletised in the subsequent compounding step arranged in the production line of the polymerisation process of the multimodal ethylene polymer (A-1). The use of such premade pellets of the polymer composition of the invention provides increased homogeneity to the polymer composition resulting in an irrigation pipe with better quality, e.g. in terms of mechanical and surface properties, compared to irrigation pipe which has been produced by adding the base resin, carbon black and optional additives separately to pipe extruder during the pipe production process.

Accordingly, the present invention further provides pellets of a polymer composition, wherein a pellet comprises, preferably consists of, the polymer composition of the invention as defined above, below or in claims.

The invention is further related to a process for producing the drip irrigation pipe according to any of the above described embodiments including the preferred properties and property ranges, comprising the steps of providing the polymer composition as defined above or in claims;

mixing at least the polymer composition in a mixer, preferably in an extruder, to form a melt mixture of the polymer composition;

forming, preferably extruding, the obtained melt mixture of the polymer composition into form of a pipe, and punching perforations at intervals along the length of the formed, preferably extruded, pipe wall for discharging water from the punched perforations.

As mentioned above, advantageously, the carbon black, in amounts as defined above or in claims, is homogeneously distributed in the pellets of the polymer composition which further contributes markedly to the quality, i.e. mechanical and surface properties, of the obtained irrigation pipe. Thus further preferably, pellets of the polymer composition are used in the process of the invention.

Accordingly, preferably the process of the invention comprises the steps of providing the polymer composition in form of pellets, wherein a pellet comprises, preferably consists of, the polymer composition as defined above or in claims;

mixing at least said pellets of the polymer composition in a mixer, preferably in an extruder, to form a melt mixture of the polymer composition;

forming, preferably extruding, the obtained melt mixture of polymer composition into form of pipe, and punching perforations at intervals along the length of the formed, preferably extruded, pipe wall for discharging water from the punched perforations.

It is preferred that the irrigation pipe comprises emitters at the location of the perforations of the pipe. Accordingly, preferably the process of the invention is:

On-line process, wherein the end user, e.g. farmer, punches the perforations at intervals along the length of the pipe and inserts the emitters into the formed perforations. Thereby, the emitters are inserted into the holes from the outside of the pipe. Or In-line process, wherein the perforations and emitters are provided by the pipe producer during the pipe production process. The difference is in the order and method how said perforations and emitters are introduced into the pipe. I.e in the in-line process the emitters are inserted into the inner pipe wall, at intervals (=emitters are inserted at certain distance from each other, as desired, depending on the end application) along the pipe length, at time of forming, preferably extruding, the pipe.

Both on-line and in-line processes for producing irrigation pipe are well known techniques in the field of pipe technology.

It is preferred that the process for producing the irrigation pipe of the invention is an in-line process comprising the steps of providing the polymer composition, preferably in form of pellets as defined above or in claims;

mixing at least the polymer composition, preferably said pellets of the polymer composition, in a mixer, preferably in an extruder, to form a melt mixture of the polymer composition;

forming, preferably extruding, the obtained melt mixture of polymer composition into form of pipe, inserting emitters at intervals into the inner pipe wall along the length of the pipe at time of the formation, preferably at time of extrusion, of said pipe shape, and punching perforations to the formed pipe wall at the location of the inserted emitter for discharging water from the punched perforation through said inserted emitter.

Preferably the irrigation pipe of the invention is produced by extrusion using a pipe extruder. Preferably the forming of the melt mixture is carried out in the pipe extruder in an elevated temperature in a manner well known in the art. Pipe extruders are well known in the art and commercially available.

Moreover, the preferred pipe emitter feeding equipment for pipe extruders to insert the emitters inside the pipe during the pipe formation as well as perforation equipment for hole punching are well known in the art and commercially available.

The preferred in-line process and the "in-line" irrigation pipe are described below in further details.

Accordingly, the emitters are inserted into the inner pipe wall, at intervals along the pipe length, at time of forming, preferably by extruding, the pipe shape and before perforation (punching) further downstream of the process. Perforations are provided after cooling the formed pipe containing the inserted emitters. Perforation is provided by punching a hole to the pipe wall at the location of each emitter. After perforation the pipe is coiled for end use.

The perforation (punching) of the pipe is effected at the intended water path point of the emitter. In case the emitter has two or more water path arrangements the perforation (punching) is done at the location of each intended water discharge point.

The present invention further provides a drip irrigation pipe provided with perforations in the pipe wall for discharging water, which perforations are arranged at intervals along the length of the pipe, wherein the pipe comprises a polymer composition comprising (A) a polymer base resin comprising (A-1) a multimodal ethylene polymer having a density of 930 kg/m$^3$ or less, and (A-2) a further ethylene polymer which is other than the multimodal ethylene polymer (A-1) and selected from (A-2-a) ethylene polymer produced in the presence of a coordination catalyst or (A-2-b) ethylene polymer produced in a high pressure polymerization process in the presence of a radical initiator, or mixtures thereof, wherein the amount of the multimodal ethylene polymer (A-1) is of 65 wt % to 96 wt % and the amount of the ethylene polymer (A-2) is of 4 wt % to 35 wt %, based on the total amount of the polymer base resin (A); and (B) carbon black;

wherein the polymer composition has a MFR$_5$ of 1.5 g/10 min to 10 g/10 min; as defined above or in claims.

The produced drip irrigation pipe according to the invention comprises, preferably consists of, the polymer composition as defined above in any of the described embodiments including preferred properties and property ranges, in any order.

Preferably the irrigation pipe is provided with emitters arranged at the location of the perforation for controlling the water discharge from the perforation.

The irrigation pipe has at least perforations along the length of the pipe. Preferably the irrigation pipe is provided with perforations in the pipe wall along the length of the pipe and emitters which locate at perforation points for controlling the water discharge in a desired manner.

The dimensions of the irrigation pipe can vary depending on the size of the intended pipe and on the desired irrigation performance at the end use site, and can be chosen accordingly as known in the art.

Preferably the pipe has a diameter of 35 mm or less, more preferably of 32 mm or less. The lower limit of the diameter is usually 5 mm or more.

The pipe preferably has a wall thickness of less than 3 mm, more preferably of less than 2.5 mm. The lower limit of the wall thickness is usually 0.3 mm or more.

The diameter of the perforations is preferably more than 1 mm.

The pipe preferably has a cross-section of round or ellipse shape. "Ellipse" in this regard means that the round cross-section is flattened along one axis of the cross-section to form an ellipse or oval shape.

It is preferred that the irrigation pipe of the invention is produced by the in-line process, i.e. is a product of an in-line pipe production process.

Due to different insertion techniques the emitters in in-line process are different from those of the on-line process.

The in-line emitter can contain one or more water path arrangement(s) arranged on one surface of the in-line emitter structure. The in-line emitter has typically either cylindrical structure or flat, rectangular or similar, (longitudinally) shaped structure with thickness, length and width depending on the size of the irrigation pipe and on the desired, water discharge performance at the end use site (referred herein as flat rectangular emitter).

Cylindrical emitters are used in cylindrical pipes and the diameter of the outer circumference is chosen so that the outer circumference contacts the inner wall of the pipe and is adhered to said inner wall. The water path arrangement(s) is arranged on the surface of the outer circumference of said cylindrical emitters. The length of the cylindrical emitter on the size of the irrigation pipe and on the desired, water discharge performance at the end use site. As an example said length can be 1 to 5 cm.

Flat rectangular emitters are typically used in flat pipes of ellipsoid shape. The size of the flat rectangular emitters varies depending on the size of the intended pipe and on the desired irrigation performance at end use site. As a preferable example, the thickness of flat rectangular typically of less than 0.5 to 4 mm, length typically of than 1 to 5 cm and width of 0.4 to 2.5 cm, depending on the size of the pipe and on the desired irrigation performance at end use site. The water path arrangement(s) is provided to at least one position on the surface of the flat rectangular emitter.

In cylindrical and flat rectangular shaped emitters of the in-line produced irrigation pipe, the water path(s) of the emitter leads to intended water discharge point and the punctured perforation of the pipe wall locates at this point.

Figure 2:
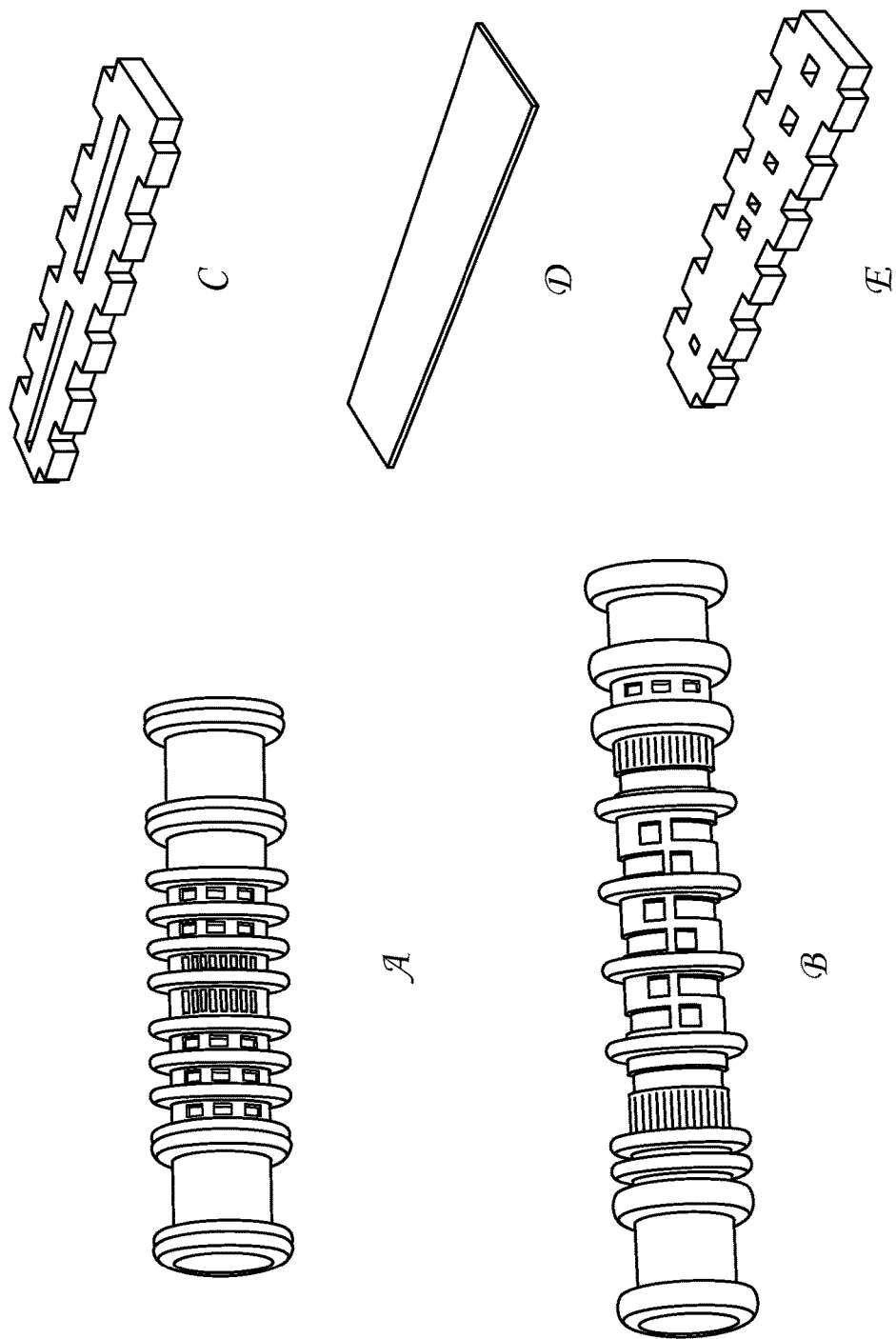

Both in-line and on-line emitters are very well known in the state of the art and commercially available. Different suitable emitters are shown in FIGS. 1 and 2. Thereby, emitters for the on-line process are illustrated in FIG. 1 and those for the in-line process in FIG. 2.

Further, the pipe preferably has a die swell ratio at a load of 2.16 kg of 1.2 or more. The maximum die swell ratio is not critical, and a typical example is up to 1.8.

Moreover, the water discharge performance can be controlled as required in the end application.

Furthermore, the irrigation pipe of the invention has preferably reduced kinking.

The present invention is further related to the use of a polymer composition comprising
(A) a polymer base resin comprising
(A-1) a multimodal ethylene polymer having a density of 930 kg/m$^3$ or less, and
(A-2) a further ethylene polymer which is other than the multimodal ethylene polymer (A-1) and selected from
(A-2-a) ethylene polymer produced in the presence of a coordination catalyst or
(A-2-b) ethylene polymer produced in a high pressure polymerization process in the presence of a radical initiator, or mixtures thereof,
wherein the amount of the multimodal ethylene polymer (A-1) is of 65 wt % to 96 wt % and the amount of the ethylene polymer (A-2) is of 4 wt % to 35 wt %, based on the total amount of the polymer base resin (A); and
(B) carbon black;
wherein the polymer composition has a MFR$_5$ of 1.5 g/10 min to 10 g/10 min for the production of a drip irrigation pipe provided with perforations in the pipe wall for discharging water, which perforations are arranged at intervals along the length of the pipe.

The polymer composition is as defined above in any of the described embodiments including preferred properties and property ranges, in any order.

The present invention is further characterized by means of the following examples:

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_5$ of polyethylene is measured at a temperature 190° C. and a load of 5 kg, the MFR$_2$ of polyethylene at a temperature 190° C. and a load of 2.16 kg and the MFR$_{21}$ of polyethylene is measured at a temperature of 190° C. and a load of 21.6 kg. The quantity FRR (flow rate ratio) denotes the ratio of flow rates at different loads. Thus, FRR$_{21/5}$ denotes the ratio of MFR$_{21}$/MFR$_5$.

b) Density

Density of the polymer was measured according to ISO 1183-1:2004 Method A on compression moulded specimen prepared according to EN ISO 1872-2 (February 2007) and is given in kg/m$^3$.

c) Comonomer Content

Comonomer content in polyethylene was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 250 μm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

d) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99 using the following formulas:

$$M_n = \frac{\sum_{i=1}^{N} A_i}{\sum (A_i/M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i/M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

e) Die Swell

The extrudate swell (die swell) was evaluated by measuring afterwards the strands cut during the MFR measurement according to ISO 1133, at 190° C. with a load of 2.16 kg. Three pieces of ca 2.5 cm long strands were collected and the diameters were measured with a caliber (readability 0.01 mm).

The die swell results are expressed as swell ratios (SR), i.e. ratios of the diameter of the extruded strand to the diameter of the capillary die (=2.095 mm). The reported swell ratios were calculated from the averages of measured strand diameters.

2. Materials a) Example 1

Polymerization of the Multimodal Ethylene Polymer (A-1)

Into a first loop reactor having a volume of 50 dm$^3$ and operating at a temperature of 60° C. and a pressure of 65 bar 28 kg/h propane (C3), 1.0 kg/h ethylene (C2), and 0.2 kg/h hydrogen (H2) were introduced for conducting a pre-polymerization step. In addition 6.0 g/h of a solid polymerisation catalyst component produced according to the description of Example 1 of EP 1 378 528 was introduced into the reactor together with triethylaluminium cocatalyst so that the ratio of aluminium to titanium was 30 mol/mol. The polymer production rate in this prepolymerization reactor was about 0.5 kg/h.

The slurry was withdrawn intermittently from the prepolymerization reactor and directed to a second loop reactor having a volume of 500 dm$^3$ and operating at a temperature of 85° C. and a pressure of 61 bar for producing the LMW component. Additionally, 42 kg/h propane, ethylene, 1-butene comonomer (C4) and hydrogen were fed to the second loop reactor whereby the ethylene concentration, the molar 1-butene to ethylene ratio and the molar hydrogen to ethylene ratio are given in table 1 below. The density and melt flow rates of the polymer fraction produced in the second loop reactor and the melt flow rate MFR$_2$ are given in table 1 below. The polymer production rate in this second loop reactor was about 25 kg/h.

The slurry was withdrawn intermittently from the second loop reactor by using settling legs and directed to a flash vessel operated at a temperature of 50° C. and a pressure of 3 bar where the hydrocarbons were substantially removed from the polymer. From the flash vessel the polymer was directed to a gas phase reactor. The gas phase reactor was operated at a temperature of 80° C. and a pressure of 20 bar for producing the HMW component. Additional ethylene, 1-butene comonomer, nitrogen as inert gas and hydrogen were fed whereby the ethylene concentration, the molar 1-butene to ethylene ratio and the molar hydrogen to ethylene ratio are given in table 1. The production split, density, melt flow rates MFR$_2$, MFR$_5$ and MFR$_{21}$ are given in table 1 below. The polymer production rate in this gas phase reactor was about 48 kg/h.

TABLE 1

Polymerisation conditions and properties of
the ethylene polymer (A-1) and Ref. C12

|  | Multimodal ethylene polymer (A-1) Used also as Ref. C12 |
| --- | --- |
| Prepolymerizer: |  |
| Temperature [° C.] | 60 |
| Pressure [bar] | 65 |
| Production rate [kg/h] | 0.5 |
| Split [wt %] | 1 |

TABLE 1-continued

Polymerisation conditions and properties of
the ethylene polymer (A-1) and Ref. C12

|  | Multimodal ethylene polymer (A-1) Used also as Ref. C12 |
| --- | --- |
| Loop reactor: | |
| Temperature [° C.] | 85 |
| Pressure [bar] | 61 |
| H2/C2 [mol/kmol] | 370 |
| C2-concentration [mol %] | 7 |
| C4/C2 [mol/kmol] | 650 |
| Production rate [kg/h] | 25 |
| Split [wt %] | 40 |
| MFR$_2$ [g/10 min] | 300 |
| Density [kg/m$^3$] | 955 |
| Gas phase reactor: | |
| Temperature [° C.] | 80 |
| Pressure [bar] | 20 |
| H2/C2 [mol/kmol] | 15 |
| C4/C2 [mol/kmol] | 760 |
| C2-concentration [mol %] | 23 |
| Split [wt %] | 59 |
| Production rate [kg/h] | 38 |
| MFR$_2$ [g/10 min] | 0.6 |
| MFR$_5$ [g/10 min] | 2.4 |
| Density [kg/m$^3$] | 923 | b) Ethylene Polymer (A-2)

As ethylene polymer (A-2), a conventional unimodal high density ethylene grade (A-2-a) or a conventional unimodal low density ethylene grade (A-2-b) has been used.

(A-2-a) refers to a conventional unimodal HDPE produced in a low pressure process in the presence of a conventional Ziegler-Natta catalyst and having a density of 962 kg/m$^3$ and a MFR$_2$ of 14 g/10 min.

(A-2-b) refers to a unimodal LDPE polymerized in tubular high pressure process in the presence of conventional radical initiator (peroxide) and having a density of 923 kg/m$^3$ and a MFR$_2$ of 2.4 g/10 min. (A-2-b) is commercially available from Borouge.

(A-2-a) and (A-2-b) were used in pellet form consisting of the polymer and commercially available antioxidant and calcium stearate in conventional amounts.

c) Premix of Carbon Black (B)

Carbon black is added to the inventive polymer compositions and to the reference compositions 9 and 10 as a premix.

The premix was formed by mixing 40 wt % of a commercially available carbon black (supplier Cabot) in 60 wt % of either pellets of ethylene polymer (A-2-a) or pellets of ethylene polymer (A-2-b). The premix added to the multimodal ethylene polymer (A-1) in an amount of 5 wt % calculated from the final polymer composition. The premix was mixed in a conventional extruder and pelletize in a manner known in the art.

d) Compounding of the Inventive and Reference Compositions Inv.C1-Inv.C8 and Ref.C9 and Ref.C10

The resulting polymer powder (A-1) of Example 1 was dried from hydrocarbons and mixed with commercially available antioxidant and calcium stearate in conventional amounts as well as with the remaining part of pellets of ethylene polymer (A-2-a) and/or (A-2-b), as given in Table 2 below, and the carbon black premix as described above. The final amounts of the ethylene polymer (A-2-a) or (A-2-b) are given in Table 2 below.

The mixture was then extruded in a conventional manner under nitrogen atmosphere into pellets by using a counter-rotating twin screw extruder CIM90P (manufactured by Japan Steel Works). The properties of the compounded composition are shown in Table 1. The temperature profile in each zone was 90/120/190/250° C.

e) The Reference Example Ref.C11

Ref.C11 was a commercial polymer grade containing bimodal linear low density ethylene copolymer (C4 as comonomer, MFR$_2$ 0.3 g/10 min, density 923 kg/m$^3$) produced in conventional manner in a multistage process in the presence of a Ziegler-Natta catalyst and a commercial carbon black in amount of about 2 wt %.

f) The Reference Example Ref.C12

Ref.C12 is the multimodal ethylene polymer (A-1) as such (without compounding with carbon black and (b) ethylene polymer A-2). The preparation and properties of Ref.C12 are as given above for example 1 under (a).

The properties of the compounded compositions are shown in Table 2.

TABLE 2

Final compounded polymer compositions

| | Components* | | | | Properties | | |
| --- | --- | --- | --- | --- | --- | --- | --- |
|  | A-1 wt %* | CB wt %* | A-2-a wt %* | A-2-b wt %* | MFR (2.16) | MFR (5) | Die swell** |
| Inv.C1 | 90 | 2 | 8 | — | 0.6 | 2.6 | 1.41 |
| Inv.C2 | 90 | 2 | 5 | 3 | 0.6 | 2.4 | 1.42 |
| Inv.C3 | 85 | 2 | 13 | — | 0.7 | 2.9 | 1.41 |
| Inv.C4 | 85 | 2 | 10 | 3 | 0.6 | 2.7 | 1.43 |
| Inv.C5 | 90 | 2 | 3 | 5 | 0.6 | 2.2 | 1.44 |
| Inv.C6 | 90 | 2 | — | 8 | 0.6 | 2.0 | 1.44 |
| Inv.C7 | 85 | 2 | 3 | 10 | 0.5 | 2.2 | 1.46 |
| Inv.C8 | 85 | 2 | — | 13 | 0.5 | 2.0 | 1.48 |
| Ref.C9 | 95 | 2 | 3 | — | 0.6 | 2.4 | 1.40 |
| Ref.C10 | 95 | 2 | — | 3 | 0.6 | 2.4 | 1.43 |
| Ref.C11 |  |  |  |  | 0.3 |  | 1.2 |
| Ref.C12 |  |  |  |  | 0.6 | 2.4 | 1.2 |

*wt % of the components of the inv.C1-Inv.C8 is based on the combined amount of the components A-1, CB, A-2-a and A-2-b.
**The Die Swell given in Table 2 was measured using the pellets of the test compositions at 2.16 kg.
Ref.C9, Ref.C10 and Ref.C11 represent prior art polymer compositions for irrigation pipes comprising 3 wt % carrier polymer of the carbon black master batch.
Ref.C12 is the multimodal ethylene polymer (A-1) without carbon black

The invention claimed is:
1. A polymer composition comprising
(A) a polymer base resin comprising
(A-1) a multimodal ethylene polymer having a density of 930 kg/m$^3$ or less, and
(A-2) a further ethylene polymer which is other than the multimodal ethylene polymer (A-1) and includes at least
(A-2-b) ethylene polymer produced in a high pressure polymerization process in the presence of a radical initiator, or mixtures thereof,
wherein the amount of the multimodal ethylene polymer (A-1) is 65 wt % to 96 wt % and the amount of the ethylene polymer (A-2) is 4 wt % to 35 wt %, based on the total amount of the polymer base resin (A); and (B) carbon black;

wherein the polymer composition has a MFRs of 1.5 g/10 min to 10 g/10 min; and wherein the ethylene polymer (A-2) is a mixture of ethylene polymer (A-2-a), which is produced in the presence of a coordination catalyst, and ethylene polymer (A-2-b), wherein the weight ratio of ethylene polymer (A-2-a) and ethylene polymer (A-2-b) is from 97:3 to 3:97.

2. The polymer composition according to claim 1, wherein the ethylene polymer (A-2) is a mixture of ethylene polymer (A-2-b) which is LDPE and of the ethylene polymer (A-2-a) which is HDPE homo or copolymer of ethylene.

3. A drip irrigation pipe provided with perforations in the pipe wall for discharging water, which perforations are arranged at intervals along the length of the pipe, wherein the pipe comprises a polymer composition as defined in claim 1.

4. The pipe according to claim 3, wherein the pipe is provided with emitters arranged at the location of the perforation for controlling the water discharge from the perforation.

5. The pipe according to claim 3 having a diameter of 35 mm or less and a wall thickness of less than 3 mm.

6. The pipe according to claim 3, wherein the pipe is produced using an in-line process and has a cross-section of round shape or ellipse shape, and wherein the pipe comprises emitters with cylindrical or flat rectangular shape.

7. The polymer composition of claim 1, that is in the form of pellets.

8. A process for producing a drip irrigation pipe, comprising the steps of providing a polymer composition comprising (A) a polymer base resin comprising
  (A-1) a multimodal ethylene polymer having a density of 930 kg/m³ or less, and
  (A-2) a further ethylene polymer which is other than the multimodal ethylene polymer (A-1) and includes at least
    (A-2-b) ethylene polymer produced in a high pressure polymerization process in the presence of a radical initiator, or mixtures thereof,
    wherein the amount of the multimodal ethylene polymer (A-1) is 65 wt % to 96 wt % and the amount of the ethylene polymer (A-2) is 4 wt % to 35 wt %, based on the total amount of the polymer base resin (A); and (B) carbon black;

wherein the polymer composition has a MFRs of 1.5 g/10 min to 10 g/10 min; and wherein the ethylene polymer (A-2) is a mixture of ethylene polymer (A-2-a), which is produced in the presence of a coordination catalyst, and ethylene polymer (A-2-b), wherein the weight ratio of ethylene polymer (A-2-a) and ethylene polymer (A-2-b) is from 97:3 to 3:97;

mixing the polymer composition in a mixer to form a melt mixture of the polymer composition;

forming the obtained melt mixture of the polymer composition into a form of a pipe having a wall; and punching perforations at intervals along the length of the formed pipe wall for discharging water from the punched perforations.

9. The process according to claim 8, wherein the process comprises steps of providing the polymer composition in the form of pellets;

mixing said pellets of the polymer composition in a mixer to form the melt mixture of the polymer composition;

forming the obtained melt mixture of polymer composition into the form of the pipe; and punching perforations at intervals along the length of the formed pipe wall for discharging water from the punched perforations.

10. The process according to claim 8 which is an in-line process further comprising the steps of inserting emitters at intervals into an inner pipe wall along the length of the pipe at time of the formation of said pipe shape; and punching perforations into the formed pipe wall at the location of the inserted emitter, for discharging water from the punched perforation through said inserted emitter.

11. The process according to claim 8 which is an in-line process comprising the steps of providing the polymer composition in the form of pellets;

mixing the pellets of polymer composition in a mixer to form a melt mixture of the polymer composition;

forming the obtained melt mixture of polymer composition into the form of the pipe;

inserting emitters at intervals into an inner pipe wall along the length of the pipe at time of the formation of said pipe shape; and punching perforations to the formed pipe wall at the location of the inserted emitter, for discharging water from the punched perforation through said inserted emitter.

12. The polymer composition according to claim 1, wherein the ethylene polymer (A-2-a) is produced in the presence of a Ziegler-Natta catalyst system and selected from linear low density copolymer of ethylene (LLDPE) having a density from 918 and up to 930 kg/m³, medium density copolymer of ethylene (MDPE) having a density more than 930 and less than 950 kg/m³, and high density homopolymer or copolymer of ethylene (HDPE) having a density from 950 to 978 kg/m³ or from a mixture thereof.

* * * * *